(12) United States Patent
Thayer et al.

(10) Patent No.: US 10,759,004 B2
(45) Date of Patent: Sep. 1, 2020

(54) LASER REMOVAL OF CASTING SCALE

(71) Applicant: UNITED TECHNOLOGIES CORPORATION, Farmington, CT (US)

(72) Inventors: Henry H. Thayer, Wethersfield, CT (US); Amra Peles, South Windsor, CT (US); Dmitri Novikov, Avon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 277 days.

(21) Appl. No.: 16/011,299

(22) Filed: Jun. 18, 2018

(65) Prior Publication Data

US 2019/0381607 A1   Dec. 19, 2019

(51) Int. Cl.
| | | |
|---|---|---|
| *B23K 26/16* | (2006.01) |
| *B23K 26/352* | (2014.01) |
| *B23K 26/36* | (2014.01) |
| *B23K 26/40* | (2014.01) |
| *B23K 26/38* | (2014.01) |
| *B23K 26/0622* | (2014.01) |
| *B23K 26/142* | (2014.01) |
| *B23K 26/60* | (2014.01) |
| *B23K 103/04* | (2006.01) |

(52) U.S. Cl.
CPC .......... *B23K 26/38* (2013.01); *B23K 26/0624* (2015.10); *B23K 26/142* (2015.10); *B23K 26/60* (2015.10); *B23K 2103/04* (2018.08)

(58) Field of Classification Search
CPC ............ B23K 26/14–142; B23K 26/16; B23K 26/352–356; B23K 26/36–362; B23K 26/40
See application file for complete search history.

(56) References Cited

U.S. PATENT DOCUMENTS 4,063,063 A    12/1977   Funck et al.
4,878,953 A  * 11/1989   Saltzman ................. B23K 9/04
                                                         148/512
(Continued)

FOREIGN PATENT DOCUMENTS

JP    1984053688    3/1984
JP    H02197588     8/1990
(Continued)

OTHER PUBLICATIONS

Abstract in English for JP 1984053688A dated Mar. 28, 1984.
(Continued)

*Primary Examiner* — Michael A Laflame, Jr.
(74) *Attorney, Agent, or Firm* — Snell & Wilmer L.L.P.

(57) ABSTRACT

A method of removing scale from a casting may include positioning the casting relative to a laser emitter. The casting may comprise a superalloy and the scale may have formed on the surfaces thereof, with the scale being a byproduct of a method of manufacturing the casting. The method may also include passing a laser beam emitted from the laser emitter across the casting such that the laser beam causes the scale to at least one of crack, break, shatter, and spall. The superalloy may be a nickel-based superalloy and the scale may include a metal carbide layer.

20 Claims, 2 Drawing Sheets

(56) References Cited

U.S. PATENT DOCUMENTS

| | | | | |
|---|---|---|---|---|
| 4,960,611 A | * | 10/1990 | Fujisawa | B05D 3/06 |
| | | | | 427/504 |
| 5,851,409 A | * | 12/1998 | Schaeffer | C23F 1/44 |
| | | | | 216/2 |
| 5,948,172 A | | 9/1999 | Neiheisel | |
| 6,084,196 A | * | 7/2000 | Flowers | B23K 9/167 |
| | | | | 219/121.46 |
| 2004/0134887 A1 | * | 7/2004 | Murphy | B23K 9/04 |
| | | | | 219/76.14 |
| 2005/0067065 A1 | * | 3/2005 | Fernihough | C30B 11/00 |
| | | | | 148/512 |
| 2011/0168679 A1 | * | 7/2011 | Qi | F01D 5/005 |
| | | | | 219/75 |

FOREIGN PATENT DOCUMENTS

| | | |
|---|---|---|
| JP | H07225300 | 8/1995 |
| WO | 2012010740 | 1/2012 |

OTHER PUBLICATIONS

European Patent Office, European Search Report dated Aug. 30, 2019 in Application No. 19180964.9.
EPO, Machine Translation of Japanese Patent No. JPH07225300A.
EPO, Machine Translation of Japanese Patent No. JPH02197588A.

* cited by examiner

LASER REMOVAL OF CASTING SCALE

FIELD

The present disclosure relates to manufacturing methods and systems, and more specifically to using a laser to remove casting scale from a casting.

BACKGROUND

Many parts, such as components of aircraft, are made from metallic alloys. Superalloys, which are metallic alloys that have excellent mechanical strength, resistance to thermal creep deformation, good surface stability, and/or resistance to corrosion or oxidation, are often used in various sections of gas turbine engines. These superalloy parts are often manufactured using a casting process, such as an investment casting process. However, components made via investment casting, especially those made from superalloys, are prone to scale formation during the casting process. That is, a scale layer is often formed on a cast part (referred to as a "casting") as a byproduct of the casting process. If not removed, the scale can prevent the casting from being properly inspected, which can lead to the casting being discarded, thereby resulting in a significant economic and production cost.

SUMMARY

In various embodiments, the present disclosure provides a method of removing scale from a casting. The method includes positioning the casting relative to a laser emitter, according to various embodiments. The casting may comprise a superalloy and the scale may have formed on the surfaces thereof, with the scale being a byproduct of a method of manufacturing the casting. The method also includes passing a laser beam emitted from the laser emitter across the casting such that the laser beam causes the scale to at least one of crack, break, shatter, and spall, according to various embodiments.

In various embodiments, the superalloy is a nickel-based superalloy. The nickel-based superalloy may include gamma and/or gamma prime forming elements. In various embodiments, the scale includes a metal carbide layer. In various embodiments, the metal carbide layer includes at least one of TaxCy, WxCy, NixCy, MoxCy, ZrxCy, wherein x=1, 2, 3, 4, 7, or 23 and y=1, 2, 3, or 6, in pertinent combinations. In various embodiments, the scale has a thickness between 10 and 40 micrometers.

In various embodiments, the laser emitter is a pulsed laser emitter. For example, the pulsed laser emitter may be operable in various pulse durations between 20 and 110 nanoseconds. In various embodiments, a repetition rate of the laser emitter is between 2 and 50 kHz. In various embodiments, the method of removing scale from the casting further includes emitting a liquid at the casting to facilitate removal of the scale. Emitting the liquid directed at the casting may be performed concurrently with and/or before passing the laser beam across the casting.

In various embodiments, the present disclosure also provides a manufacture method. The manufacturing method may include investment casting a part using a casting shell to form a casting of the part. The casting may be made from a superalloy, and a scale may have formed, as a byproduct of the investment casting, over at least a portion of the casting. The method may further include positioning casting relative to a laser emitter and passing a laser beam emitted from the laser emitter across the casting such that the laser beam causes the scale to at least one of crack, break, shatter, and spall. In various embodiments, the investment casting step includes selecting a grain structure and/or grain orientation (preferred grain selection). In various embodiments, a casting shell is utilized during the investment casting step, and the casting shell may include at least one of $ZrSiO_4$, $ZrO_2$, $SiO_2$, and $Al_2O_3$. In various embodiments, the investment casting is performed under vacuum.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
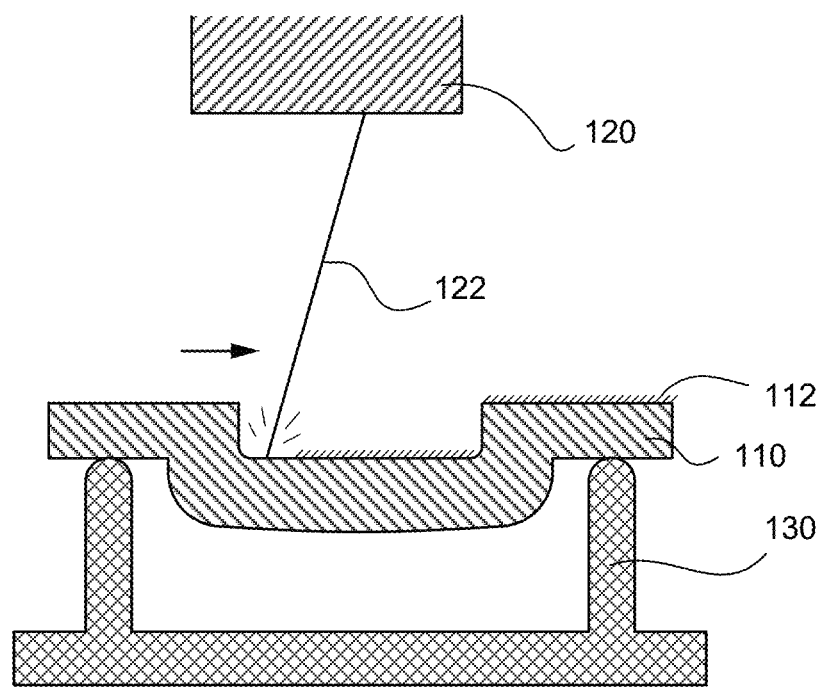
FIG. 1A illustrates a cross-sectional view of a laser beam emitter being used to remove scale from a casting, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a method and system for removing scale from a casting. The scale is a byproduct of a casting process, and is difficult, if not impossible, to remove using conventional techniques like grit blasting. The scale, as described in greater detail below, is neither an oxidation layer nor an oxidation film, but instead is a metallic carbide layer that is formed via a chemical reaction during the casting process, according to various embodiments.

Figure 1B:
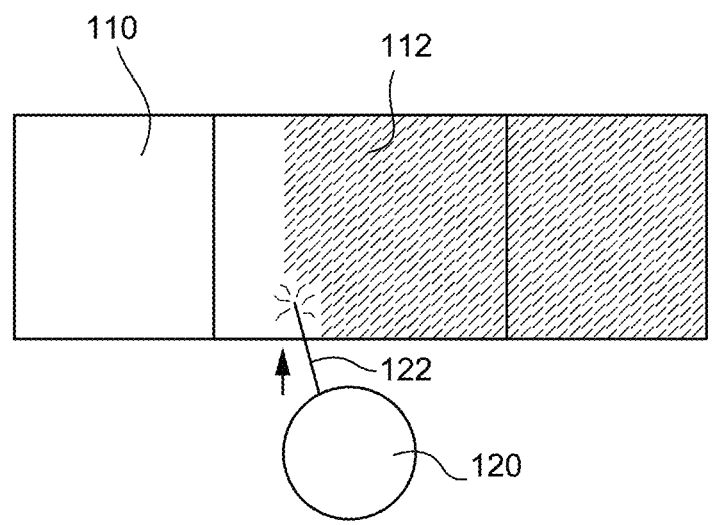
FIG. 1B illustrates a top view of a laser beam emitter being used to remove scale from a casting, in accordance with various embodiments.
Figure 2A:
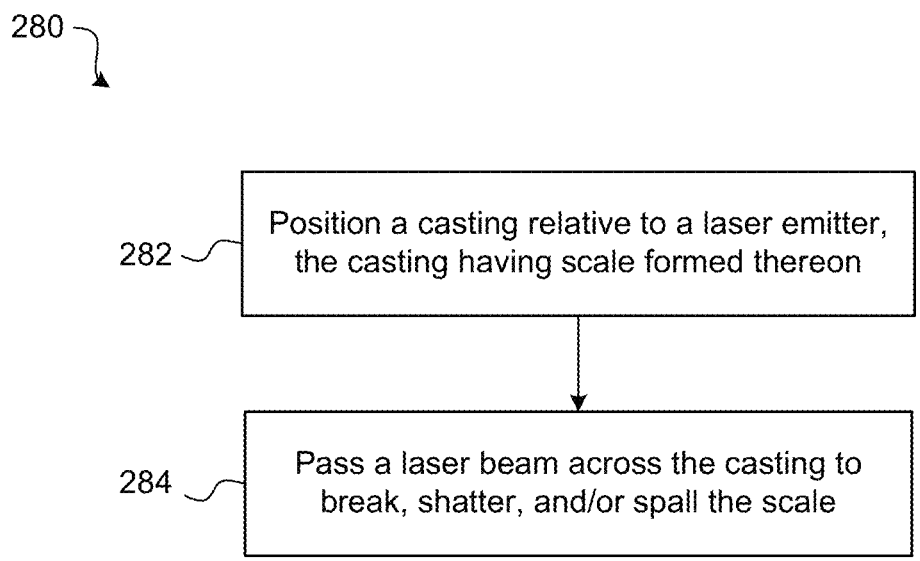
FIG. 2A is a schematic flow chart diagram of a method of removing scale from a casting, in accordance with various embodiments.

In various embodiments, and with reference to FIGS. 1A, 1B, and 2A, a method 280 of removing scale 112 from a casting 110 is provided. The method 280 includes, according to various embodiments, positioning the casting 110 relative to a laser emitter 120 at step 282 and passing a laser beam 122 from the laser emitter 120 across the casting 110 at step 284. The energy of the laser beam 122 in step 284 causes rapid and localized thermal shock to the scale 112, thereby causing the scale 112 to crack, break, shatter, spall, or otherwise cause mechanical rupture and fission to the scale 112 formed on the casting 110, according to various embodiments.

Figure 2B:
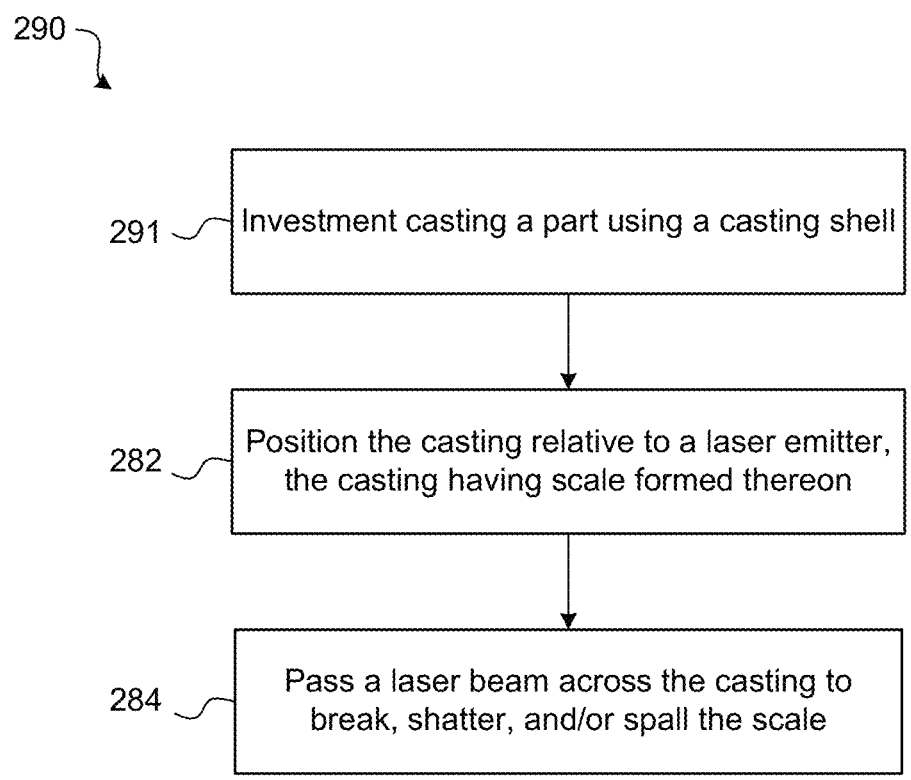
FIG. 2B is a schematic flow chart diagram of a method of manufacturing, in accordance with various embodiments.

The casting 110, according to various embodiments, is manufactured via a casting process, such as an investment casting process. Accordingly, FIG. 2B shows a schematic flowchart diagram of a method 290 of manufacturing that includes investment casting a part using a casting shell at step 291 followed by steps 282 and 284 mentioned above. In various embodiments, the casting 110 comprises a superalloy. As used herein, the term superalloy refers to metallic alloys that have excellent mechanical strength, resistance to thermal creep deformation, good surface stability, and/or resistance to corrosion or oxidation, are often used in gas turbine engines. In various embodiments, a chemical reaction occurs during the investment casting 291 of superalloys that results in the formation of the scale 112 on the surface(s) of the casting 110. For example, the superalloy of the casting 110 may reaction with a casting shell and/or environmental impurities present during the investment casting 291. That is, the casting shell may be made from $ZrO_2$, $SiO_2$, and $Al_2O_3$, among other materials, and these materials may react with the superalloy during the investment casting 291 to produce the scale 112 byproduct. In various embodiments, the scale 112 is a metal carbide material that forms from carbon in the casting furnace heating elements. That is, as the casting furnace cools, carbon vapors from the heating elements may contact the casting surface and may form the scale 112 comprising carbides. In various embodiments, the investment casting step 291 may be performed under vacuum, but the presence of environmental impurities may also promote and drive the formation of the scale 112. Accordingly, the scale 112 is neither an oxidation layer or an oxidation film (e.g., that forms during and/or after the investment casting step), but instead the scale 112 is a metallic carbide layer that is difficult, if not impossible, to remove from the casting 110 (without damaging the casting 110 itself).

In various embodiments, as mentioned above, the casting 110 is a superalloy. For example, the casting 110 may be made from a nickel-based superalloy. The nickel-based superalloy may include gamma or gamma prime forming elements, such as nickel (Ni), aluminum (Al), chromium (Cr), Cobalt (Co), molybdenum (Mo), tungsten (W), rhenium (Re), niobium (Nb), tantalum (Ta), titanium (Ti), hafnium (Hf), yttrium (Y), and/or ruthenium (Ru), as well as carbon (C), bromine (Br), and/or zirconium (Zr) strengtheners at interphase boundaries. In various embodiments, the investment casting 291 of such materials may be performed to control and select specific grain structures and/or grain orientations.

In various embodiments, as mentioned above, the scale 112 formed on the surface(s) of the casting 110 is a metal carbide layer. For example, the scale 112 may be carbides of tantalum (Ta), tungsten (W), nickel (Ni), molybdenum (Mo), and/or zirconium (Zr), among others. In various embodiments, the metal carbide layer comprises at least one of $Ta_xC_y$, $W_xC_y$, $Ni_xC_y$, $Mo_xC_y$, $Zr_xC_y$, wherein $x=1, 2, 3, 4, 7$, or 23 and $y=1, 2, 3$, or 6, in pertinent combinations. In various embodiments, the scale 112 has a thickness between about 5 micrometers and about 60 micrometers. In various embodiments, the scale 112 has a thickness between about 10 micrometers and about 40 micrometers. In various embodiments, the scale 112 has a thickness between about 15 micrometers and about 30 micrometers. As used in this context only, the term "about" means plus or minus 2 micrometers.

In various embodiments, the laser emitter 120 is a pulsed laser emitter. That is, the laser emitter 120 may be operated in various pulse durations between, for example, about 20 and 110 nanoseconds. In various embodiments, the pulse duration of the laser emitter 120 may be between about 30 and about 100 nanoseconds. As used in this context only, the term "about" means plus or minus about 5 nanoseconds. In various embodiments, the repetition rate, which refers to the number of pulses per second, of the laser emitter 120 is between 2 kHz and 50 kHz. In various embodiments, the repetition rate of the laser is between 5 kHz and 40 kHz. In various embodiments, the IPG fiber of the laser emitter 120 is 600 square micrometers, the IPG collimator is 200 millimeters, the IPG focal lens is 400 millimeters, and the spot size of the laser beam is 1.2 square millimeters. In various embodiments, the operating parameters of the laser emitter 120 may be changed based on the composition of the casting 110. Step 284 of the method 280 may facilitate improved efficiency of post-processing and inspection steps, and/or may eliminate the need for hazardous chemical etchant procedures, grit blasting procedures, and/or surface grinding procedures.

In various embodiments, method 280 and/or method 290 further include emitting a liquid at the casting 110 to facilitate removal of the cracked, spalled, or otherwise mechanically broken scale 112. That is, the thermal shock imparted to the scale 112 during step 284 (e.g., the thermal shock caused by application of the laser), which causes the scale 112 to rupture, divide, or otherwise break apart, prepares the scale 112 for removal such that a directed flow of liquid removes the thermally shocked and mechanically broken scale 112. In various embodiments, this additional step of emitting a liquid at the casting 110 may be performed concurrently with or before step 284 of passing the laser beam 122 across the surface(s) of the casting 110.

In various embodiments, the casting 110 may be placed within a retention device 130. The retention device 130 may hold and orient the casting 110 in a desired orientation during step 284 of the methods 280, 290. Step 284 may be performed by moving the laser emitter 120 while the casting 110/retention device 130 remains stationary, by moving the casting 110/retention device 130 while the laser emitter 120 remains stationary, or both the laser emitter 120 and the casting 110/retention device 130 may be movable.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of removing scale from a casting, the method comprising:
    positioning the casting relative to a laser emitter, wherein:
        the casting comprises a superalloy having the scale formed thereon, wherein the scale is a byproduct of a method of manufacturing the casting; and
    passing a laser beam emitted from the laser emitter across the casting such that the laser beam causes the scale to at least one of crack, break, shatter, and spall.

2. The method of claim 1, wherein the superalloy is a nickel-based superalloy.

3. The method of claim 2, wherein the nickel-based superalloy comprises at least one of gamma and gamma prime forming elements.

4. The method of claim 1, wherein the scale comprises a metal carbide layer.

5. The method of claim 4, wherein the metal carbide layer comprises at least one of $Ta_xC_y$, $W_xC_y$, $Ni_xC_y$, $Mo_xC_y$, $Zr_xC_y$, wherein x=1, 2, 3, 4, 7, or 23 and y=1, 2, 3, or 6, in pertinent combinations.

6. The method of claim 1, wherein the scale comprises a thickness between 10 and 40 micrometers.

7. The method of claim 6, wherein the pulsed laser emitter is operable in various pulse durations between 20 and 110 nanoseconds.

8. The method of claim 1, wherein a repetition rate of the laser emitter is between 2 and 50 kHz.

9. The method of claim 1, further comprising emitting a liquid at the casting to facilitate removal of the scale.

10. The method of claim 9, wherein emitting the liquid at the casting is performed at least one of concurrently with and before passing the laser beam across the casting.

11. A method of removing scale from a casting, the method comprising:
    positioning the casting relative to a laser emitter, wherein:
        the casting comprises a superalloy having the scale formed thereon;
        the superalloy is a nickel-based superalloy;
        the scale is a byproduct of a method of manufacturing the casting; and
        the scale comprises a metal carbide layer; and
    passing a laser beam emitted from the laser emitter across the casting such that the laser beam causes the scale to at least one of crack, break, shatter, and spall.

12. A method of manufacturing, the method comprising:
    investment casting a part using a casting shell to form a casting of the part, wherein the casting comprises a superalloy, wherein a scale is formed over at least a portion of the casting that is a byproduct of the investment casting;
    positioning the casting relative to a laser emitter; and
    passing a laser beam emitted from the laser emitter across the casting such that the laser beam causes the scale to at least one of crack, break, shatter, and spall.

13. The method of claim 12, wherein the investment casting comprises preferred grain selection.

14. The method of claim 12, wherein the casting shell comprises at least one of $ZrO_2$, $SiO_2$, and $Al_2O_3$.

15. The method of claim 12, wherein the investment casting is performed under vacuum.

16. The method of claim 12, wherein the superalloy is a nickel-based superalloy.

17. The method of claim 12, wherein the scale comprises a metal carbide layer.

18. The method of claim 17, wherein the metal carbide layer comprises at least one of $Ta_xC_y$, $W_xC_y$, $Ni_xC_y$, $Mo_xC_y$, $Zr_xC_y$, wherein x=1, 2, 3, 4, 7, or 23 and y=1, 2, 3, or 6, in pertinent combinations.

19. The method of claim 12, wherein the scale comprises a thickness between 10 and 40 micrometers.

20. The method of claim 12, further comprising emitting a liquid at the casting to facilitate removal of the scale.

* * * * *